US011874070B2

United States Patent
Abu Al-Rub et al.

(10) Patent No.: US 11,874,070 B2
(45) Date of Patent: Jan. 16, 2024

(54) SPINODAL STRUCTURES WITH BI-CONTINUOUS TOPOLOGIES FOR HEAT TRANSFER APPLICATIONS

(71) Applicant: Khalifa University of Science and Technology, Abu Dhabi (AE)

(72) Inventors: Rashid K. Abu Al-Rub, Abu Dhabi (AE); Oraib Al-Ketan, Abu Dhabi (AE)

(73) Assignee: KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 15 days.

(21) Appl. No.: 17/772,800

(22) PCT Filed: Nov. 25, 2020

(86) PCT No.: PCT/IB2020/061147
§ 371 (c)(1),
(2) Date: Apr. 28, 2022

(87) PCT Pub. No.: WO2021/105899
PCT Pub. Date: Jun. 3, 2021

(65) Prior Publication Data
US 2023/0009377 A1    Jan. 12, 2023

Related U.S. Application Data

(60) Provisional application No. 62/939,845, filed on Nov. 25, 2019.

(51) Int. Cl.
F28F 13/00 (2006.01)
F28D 7/08 (2006.01)

(52) U.S. Cl.
CPC .............. *F28D 7/08* (2013.01); *F28F 13/003* (2013.01); *F28F 2210/02* (2013.01); *F28F 2255/00* (2013.01)

(58) Field of Classification Search
CPC .. F28F 2255/00; F28F 2210/02; F28F 13/003; F28D 7/08
See application file for complete search history.

(56) References Cited

U.S. PATENT DOCUMENTS 5,698,101 A    12/1997 Kopp et al.
9,976,815 B1    5/2018 Roper et al.
(Continued)

FOREIGN PATENT DOCUMENTS

JP    2005271097 A    10/2005
JP    2013098487 A    5/2013
WO    2018054542 A2    3/2018

OTHER PUBLICATIONS

International Search Report and Written Opinion Received for PCT Application No. PCT/IB2020/061147 dated Feb. 3, 2021.
(Continued)

*Primary Examiner* — Devon Russell
(74) *Attorney, Agent, or Firm* — Billion & Armitage

(57) ABSTRACT

Heat transfer devices, components thereof, and related methods are provided. Embodiments include heat transfer devices and/or heat transfer components including a spinodal structure having a bi-continuous topology obtained by modeling a spinodal decomposition process, wherein the spinodal structure having the bi-continuous topology is a spinodal shell structure or a spinodal solid structure. Embodiments include methods of making heat transfer devices and/or heat transfer components using additive manufacturing. Other further embodiments are provided in the present disclosure.

20 Claims, 11 Drawing Sheets

(56) References Cited

U.S. PATENT DOCUMENTS

2018/0187984 A1 7/2018 Manzo
2018/0306516 A1 10/2018 Miller
2018/0328673 A1 11/2018 Stoia et al.
2019/0024987 A1 1/2019 Moore et al.

OTHER PUBLICATIONS

"Advancing Thermal Management With Additive Manufacturing", 3D Printing & Advanced Manufacturing, stratasysdirect.com, 12 pages, copyright 2019 listed at bottom of last page.
"High Intensity Thermal Exchange through Materials, and Manufacturing Processes", HITEMMP, https://arpa-e.energy.gov/technologies/programs/hitemmp, Release Date: Aug. 9, 2018.
Extended European Search Report for Application No. 20892628.7, dated Nov. 6, 2023, 7 Pages.
Hsieh, Meng-Ting, et al., "The mechanical response of cellular materials with spinodal topologies", 43 Pages.

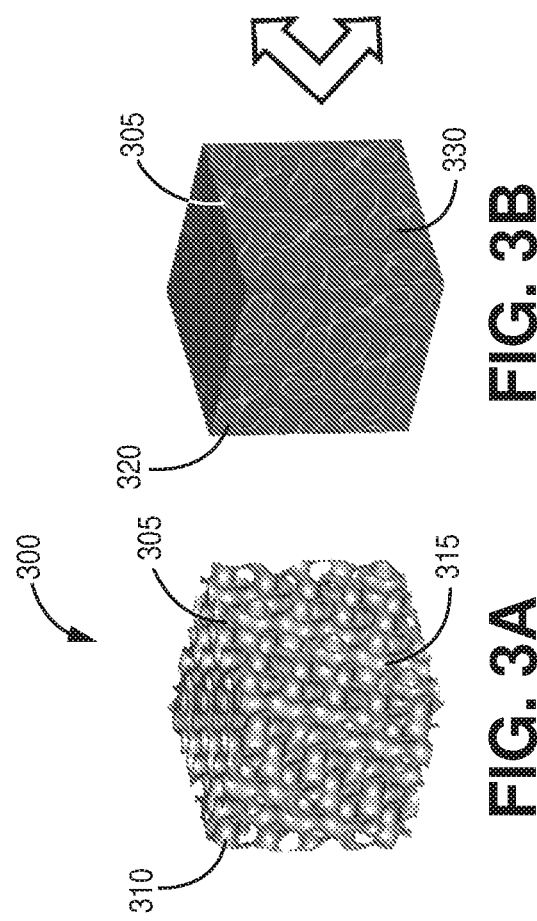
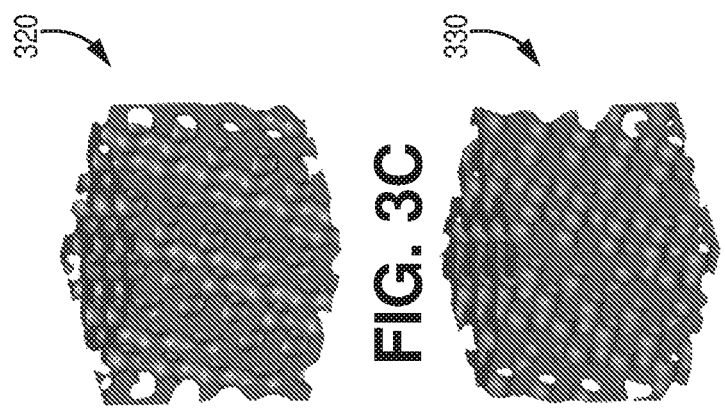
FIG. 3A FIG. 3B FIG. 3C FIG. 3D

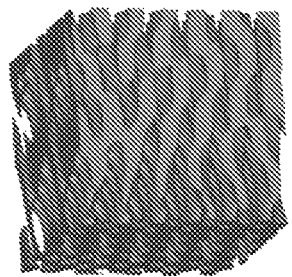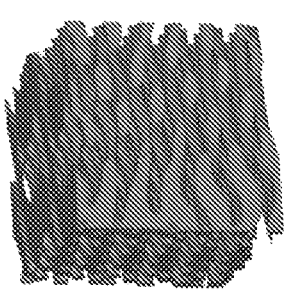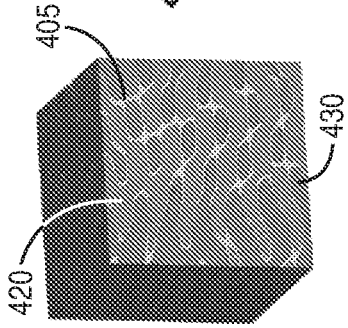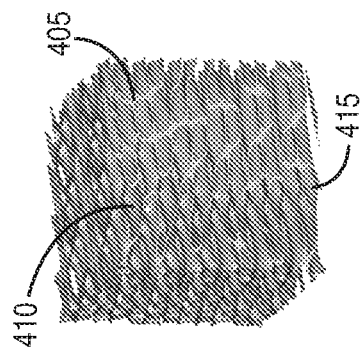

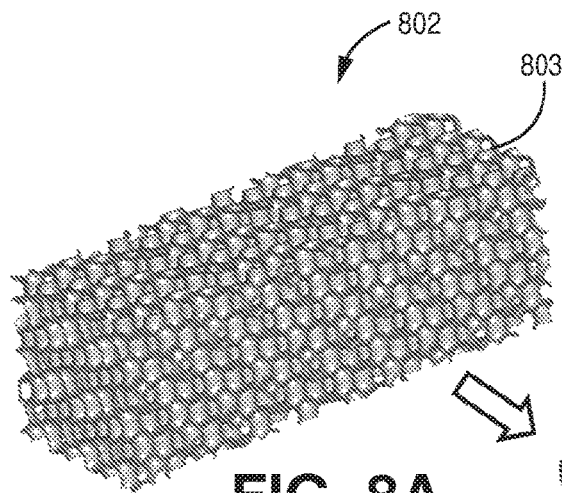
FIG. 8A
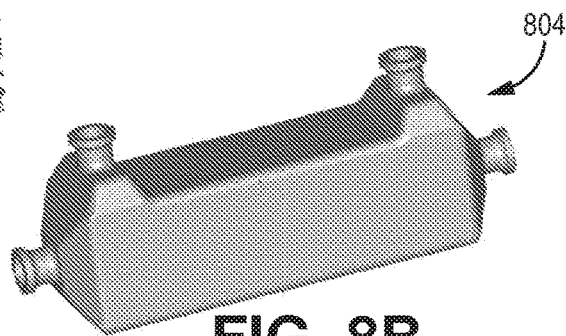
FIG. 8B
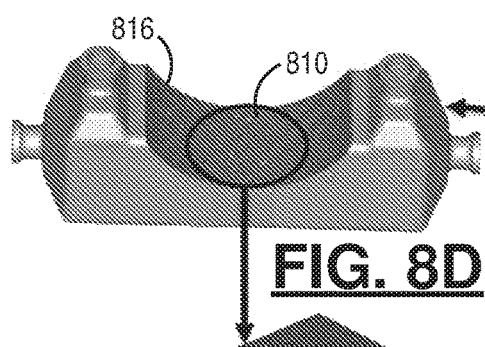
FIG. 8D
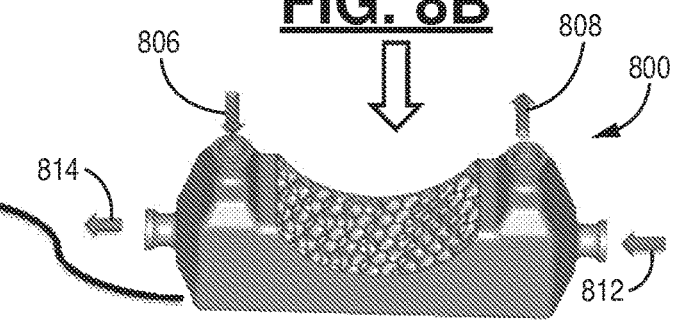
FIG. 8C
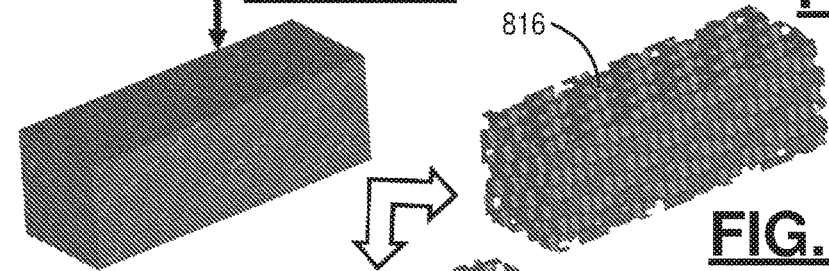
FIG. 8E
FIG. 8G
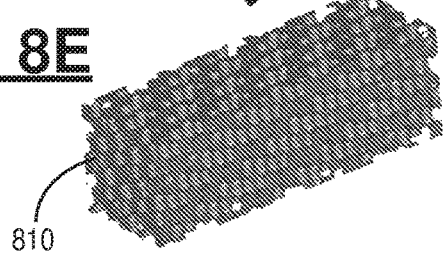
FIG. 8F

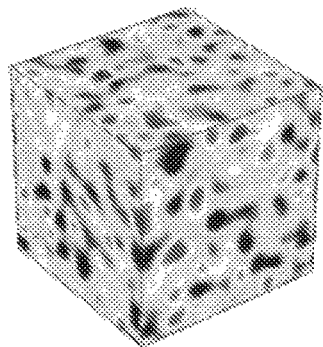 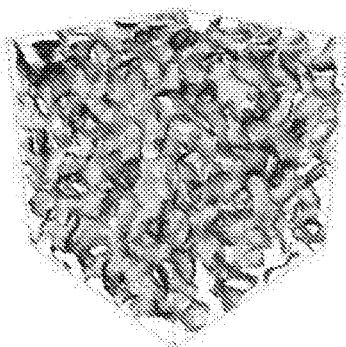 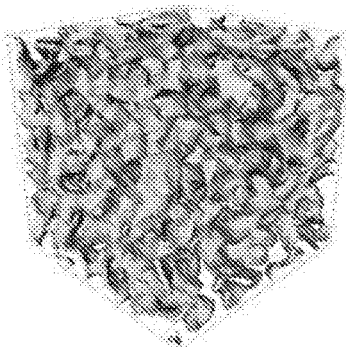
FIG. 10(A1)   FIG. 10(A2)   FIG. 10(A3)
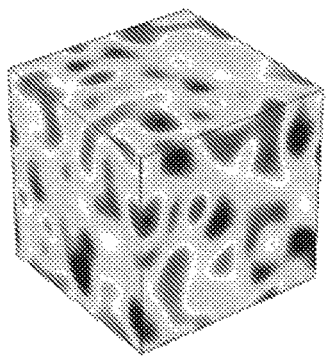 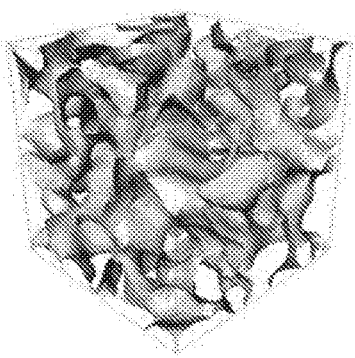 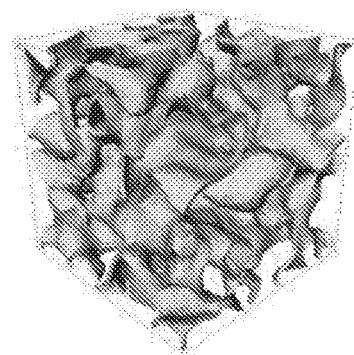
FIG. 10(B1)   FIG. 10(B2)   FIG. 10(B3)
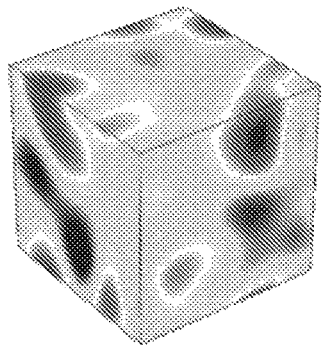 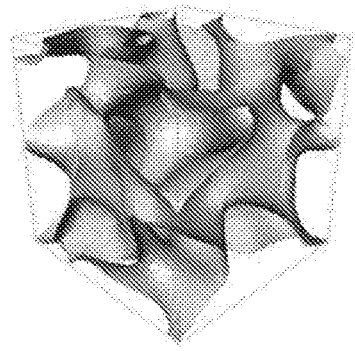 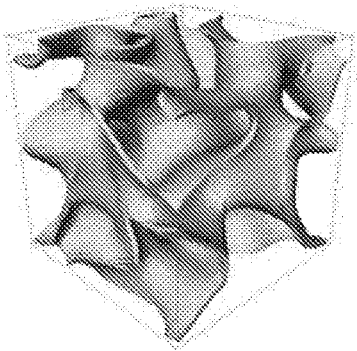
FIG. 10(C1)   FIG. 10(C2)   FIG. 10(C3)

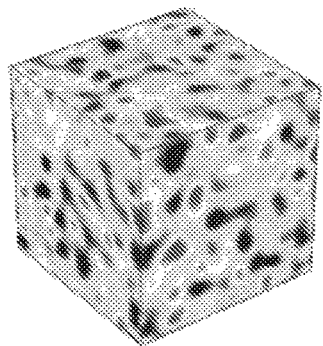 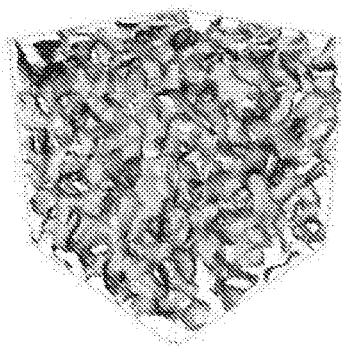 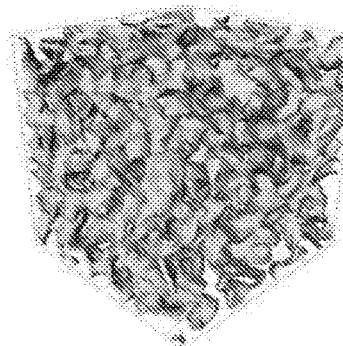
FIG. 11(A1)   FIG. 11(A2)   FIG. 11(A3)
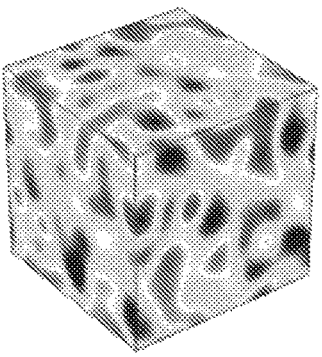 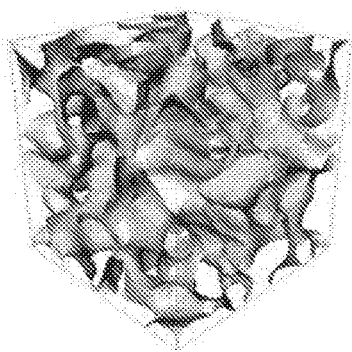 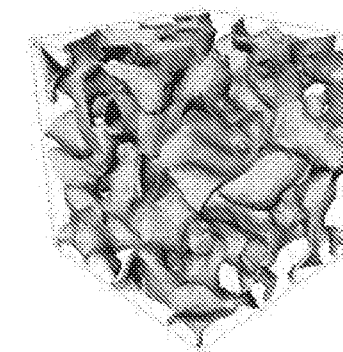
FIG. 11(B1)   FIG. 11(B2)   FIG. 11(B3)
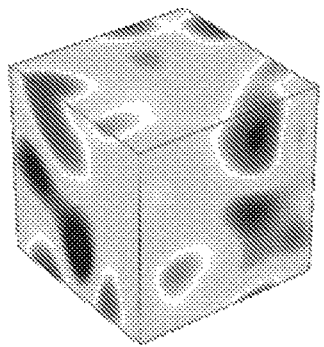 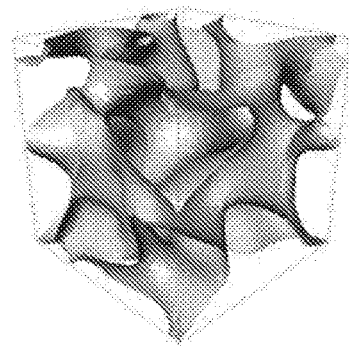 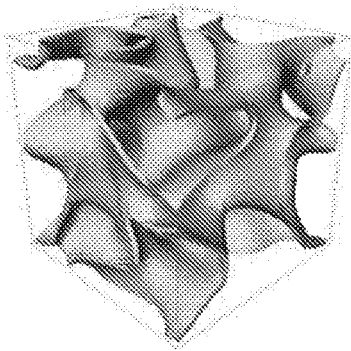
FIG. 11(C1)   FIG. 11(C2)   FIG. 11(C3)

SPINODAL STRUCTURES WITH BI-CONTINUOUS TOPOLOGIES FOR HEAT TRANSFER APPLICATIONS

BACKGROUND

Heat transfer devices include heat exchangers, heat sinks, heat storage devices, and the like. Heat exchangers are thermal management devices that facilitate the transfer of heat between two fluids indirectly. The modes of heat transfer may include convection in each fluid and conduction through the wall separating the two fluids. In designing heat exchangers, it is desirable to increase the surface area of the wall separating the two fluids to increase heat transfer. The rate of heat transfer between the two fluids at a given location in a heat exchanger depends on the magnitude of the temperature difference at that location, which varies throughout the heat exchanger.

Heat sinks are another example of a thermal management device. Heat sinks may be used for dissipating heat generated by a heat source. They are often used to cool electronic devices, among other things. In heat sinks, heat is transferred from the heat source to the heat sink walls through conduction and heat dissipation from the heat sink walls to the surrounding fluid through convection. Convective heat transfer that dissipates heat from the heat sink walls may proceed by forced convection, for example by using a forced flow stream, or by natural convection, for example by the density difference in the fluid occurring due to temperature gradient.

The effectiveness of heat exchangers and heat sinks is improved through designs having high surface area to volume ratios and low pressure drops along the flow direction. It is also advantageous to minimize fouling within the channels of the heat exchanger.

The fabrication of heat exchangers, and heat sinks involves the assembly of the different components, including but not limited to, the core, the exterior, base plates, interfacing flanges, fins, and manifolds. These components are fabricated using different machining, extrusion, and sheet forming techniques, among others. The assembly of these components involves brazing, soldering, and welding, among other techniques. The cost of manufacturing heat exchangers and heat sinks is proportional to the cost of fabricating the different components and the cost of assembly of the different components.

The numerous fabrication and assembly processes involved in the fabrication of the different types of heat exchanger increases costs considerably. Also, the multitude of these components may create leakage issues, reduce the lifetime of the heat management device, and increase maintenance costs.

SUMMARY

According to one or more aspects of the invention, a heat transfer component (e.g., a heat exchanger core, a heat sink medium, a heat storage medium, and the like) may include a spinodal structure having a bi-continuous topology obtained by modeling a spinodal decomposition process, wherein the spinodal structure having the bi-continuous topology is a spinodal shell structure or a spinodal solid structure.

According to one or more further aspects of the invention, a heat exchanger may include a heat exchanger core, the heat exchanger core including a spinodal shell structure having a bi-continuous topology obtained by modeling a spinodal decomposition process.

According to one or more additional aspects of the invention, a heat sink may include a heat sink medium, the heat sink medium including a spinodal solid structure having a bi-continuous topology obtained by modeling a spinodal decomposition process.

According to one or more other aspects of the invention, a heat storage device may include a heat storage medium, the heat storage medium including a spinodal solid structure having a bi-continuous topology obtained by modeling a spinodal decomposition process and a phase change material for heat storage.

According to one or more other additional aspects of the invention, methods of heat transfer using one or more of the heat exchangers, heat sinks, and heat storage devices of the present disclosure are provided.

According to one or more other further aspects of the invention, methods of making an article of manufacture may include additively manufacturing one or more of the heat transfer components and/or heat transfer devices (e.g., heat exchangers, heat sinks, and heat storage devices) of the present disclosure.

BRIEF DESCRIPTION OF THE DRAWINGS

FIG. 3A is a schematic diagram of a representative volume element of a heat transfer component including an anisotropic spinodal shell structure for separating a hot domain from a cold domain, according to one or more embodiments of the invention.

FIG. 3B is a schematic diagram of the representative volume element of the heat transfer component from FIG. 3A shown with the hot domain and the cold domain, according to one or more embodiments of the invention.

FIG. 3C is a schematic diagram of the cold domain from FIG. 3B shown without the anisotropic spinodal shell structure and the hot domain, according to one or more embodiments of the invention.

FIG. 3D is a schematic diagram of the hot domain from FIG. 3B shown without the anisotropic spinodal shell structure and the cold domain, according to one or more embodiments of the invention.

FIG. 4A is a schematic diagram of a representative volume element of a heat transfer component including a directional spinodal shell structure separating a hot domain from a cold domain, according to one or more embodiments of the invention.

FIG. 4B is a schematic diagram of the representative volume element of the heat transfer component from FIG. 4A shown with the hot domain and the cold domain, according to one or more embodiments of the invention.

FIG. 4C is a schematic diagram of the cold domain from FIG. 4B shown without the directional spinodal shell structure and the hot domain, according to one or more embodiments of the invention.

FIG. 4D is a schematic diagram of the hot domain from FIG. 4B shown without the directional spinodal shell structure and the cold domain, according to one or more embodiments of the invention.

FIGS. 8A-8G are schematic diagrams of a heat transfer device and related methods, according to one or more embodiments of the invention.

FIGS. 10A-10C are schematic diagrams illustrating a procedure for generating a sheet-network foams from Cahn-Hilliard equation with potential, $f(u)=(u(u-1))^2$ at increasing times: (A) 0.001, (B) 0.01, and (C) 0.1; where (A1), (B1), and (C1) depict 3D plots of the resulting two-phase microstructure; where (A2), (B2), and (C2) depict solid-network foams; and where (A3), (B3), and (C3) depict isosurface plots with thickened isosurfaces by d/L=0.01 to generate the sheet-network foams with different solid volume fractions: (A) 19.8%, (B) 14.2% and (C) 9.4%, respectively, according to one or more embodiments of the invention.

FIGS. 11A-11C are schematic diagrams illustrating a procedure for generating sheet-network foams from the Allen-Cahn equation with potential $f(u)=(u(u-1))^2$ at increasing times: (A) 1, (B) 5, and (C) 20; where (A1), (B1), and (C1) depict 3D plots of the resulting two-phase microstructure; where (A2), (B2), and (C2) depict solid-network foams; and where (A3), (B3), and (C3) depict isosurface plots with thickened isosurfaces by d/L=0.01 to generate the sheet-network foam with different relative densities: (A) 37.3%, (B) 22.5%, and (C) 13.1%, respectively, according to one or more embodiments of the invention.

DETAILED DESCRIPTION

Discussion

The present disclosure provides spinodal structures with bi-continuous topologies for heat transfer applications and, in particular, for heat exchange, heat dissipation, heat storage, and/or heat management applications, among others. It has been discovered that complex bi-continuous structures generated from numerical solutions to computational models describing various phenomena, such as phase separation processes, may be used to construct spinodal structures with bi-continuous topologies for use as heat transfer components. This strategy for designing and constructing bi-continuous spinodal structures permits their manufacture using, for example, low-cost additive manufacturing techniques, such as 3D printing, among others. Spinodal structures obtained by modeling phase separation processes, such as spinodal decomposition processes, and other phenomena offer numerous advantages, including for example and without limitation, one or more of high surface area to volume ratios, low pressure drops in the direction of fluid flow, and highly tortuous and circuitous flow channels, each of which, either alone or in combination, offer improvements in heat transfer properties. These and other benefits are described more fully herein.

Figure 1:
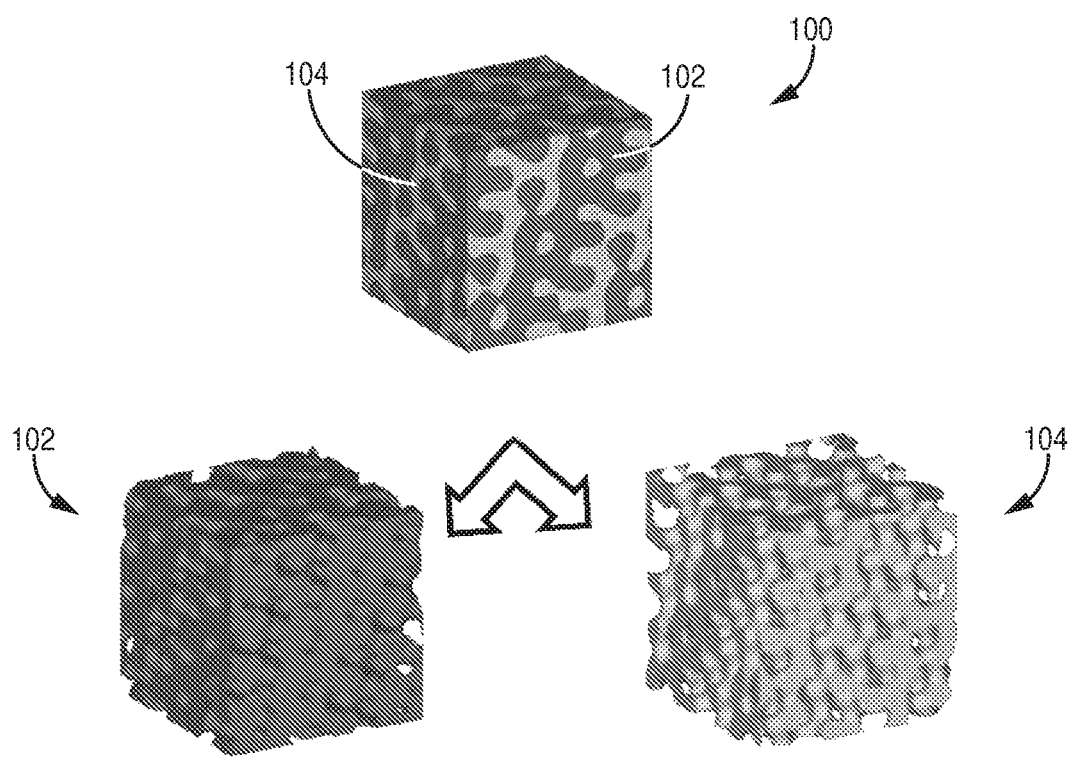
FIG. 1 is a schematic diagram of two phases generated by a spinodal decomposition process and modeled by solving the Cahn-Hilliard phase field model, according to one or more embodiments of the invention.
Figure 2:
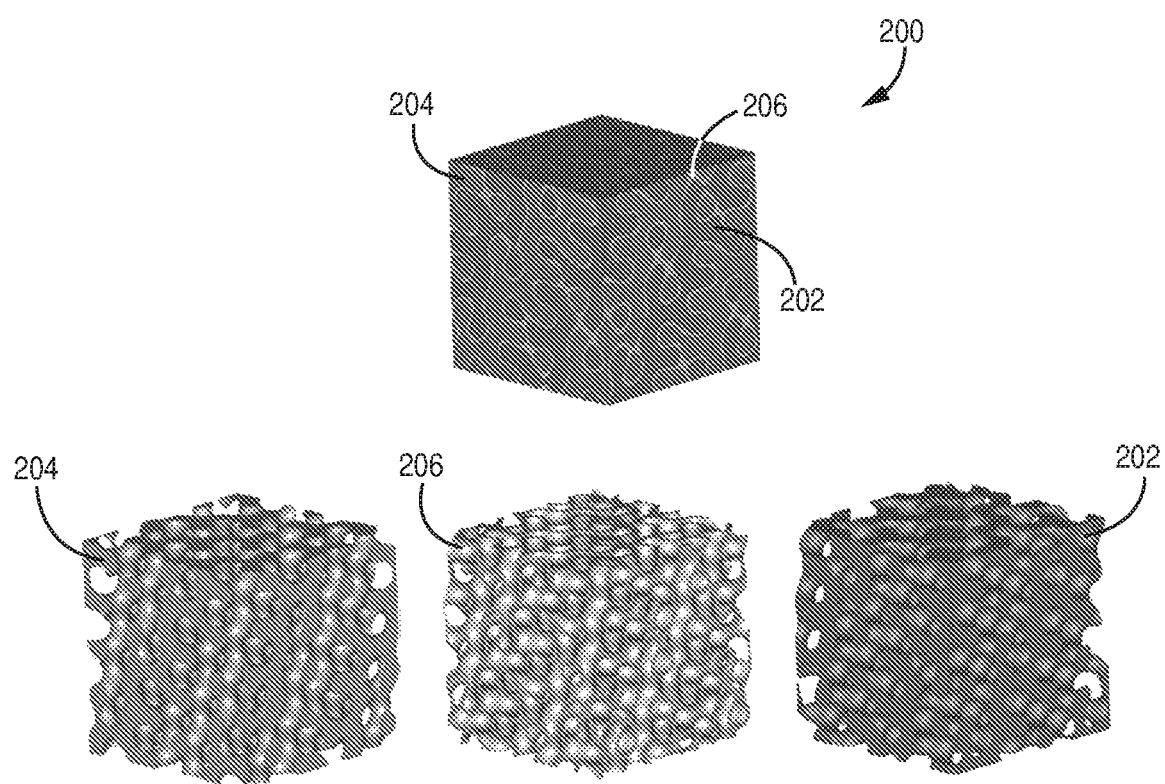
FIG. 2 is a schematic diagram of two phases separated by an interfacial shell generated by a spinodal decomposition process and modeled by solving the Cahn-Hilliard phase field model, according to one or more embodiments of the invention.

Referring to FIGS. 1-2, schematic diagrams of representative volume elements obtained by modeling spinodal decomposition processes are shown, according to one or more embodiments of the invention. Spinodal decomposition is a phase transformation process drive by diffusion and minimization of the overall interfacial energy between phases. In spinodal decomposition, a thermodynamically unstable fluid decomposes into two contiguous interpenetrating phases arranged in a bi-continuous topology and separated by a surface having nearly uniform negative Gaussian curvature and nearly zero mean curvature. Models such as the Cahn-Hilliard model may be used to describe the process of spinodal decomposition through the generation of bi-continuous structures and/or bi-continuous topologies for visual inspection. For example, in FIG. 1, a representative volume element 100 generated from a numerical solution to the Cahn-Hilliard phase field model is shown in which the representative volume element 100 includes two interpenetrating phases—namely, phase 102 and phase 104—arranged in a bi-continuous topology. In FIG. 2, a representative volume element 200 generated from another numerical solution to the Cahn-Hilliard model is shown in which the representative volume element 200 includes two interpenetrating phases 202 and 204 arranged in a bi-continuous topology and separated by an interface 206. These models and their solutions may be adapted for use in the design and construction of spinodal structures with bi-continuous topologies by modeling the phases 102, 104, 202, 204 as one or more of voids and solids, and optionally the interface 206 as a surface capable of being coarsened (e.g., thickened) to a desired thickness to create an interphase representing a shell structure. For example, modeling at least one phase as a solid may be used to obtain the spinodal solid structures of the present disclosure, whereas modeling at least two phases as a void and an interface as a thin shell may be used to obtain the spinodal shell structures of the present disclosure.

Models suitable for use herein will generate spinodal structures including two or more phases arranged in a bi-continuous topology. Accordingly, models describing spinodal decomposition processes other than the Cahn- Hilliard equation may be employed. For example, the Allen-Cahn equation and the Ginzburg-Landau equation may be used as models to generate spinodal structures with bi-continuous topologies. Each of the Allen-Cahn equation and the Ginzburg-Landau equation describe phase separation processes for multi-component alloy systems. In addition, models describing other phase separation processes may be employed, as well as models describing phenomena other than phase separation processes may be employed. For example, the Gaussian Random Field model may be used to generate spinodal structures with bi-continuous topologies. The Gaussian Random Field model is based on superimposing standing sinusoidal functions with fixed wavelengths and random amplitudes, directions, and/or phase angles. These shall not be limiting as other models capable of generating bi-continuous structures may be utilized herein without departing from the scope of the present invention.

The construction of heat transfer components including spinodal structures based on numerical solutions to models describing phenomena, such as phase separation processes, may involve additive manufacturing of a continuous monolithic structure, or it may involve contiguous periodic expansion of additively manufactured unit cells installed within a heat transfer device in one or more orthogonal directions (e.g., along a defined x-axis, along a defined y-axis, and/or along a defined z-axis). All or at least a portion of the additively manufactured unit cells may be based on, generated from, a replica of, scaled from, governed by, adapted from, created from, or otherwise derived from representative volume elements generated from the aforementioned models. The construction and/or assembly of additively manufactured unit cells may provide geometrical flexibility, enabling the construction of spinodal structures in a variety of different shapes, sizes, and/or configurations. The construction of heat transfer components may proceed automatically (e.g., without human intervention) and may employ a computer to prepare design files (e.g., computer aided design files) based on solutions to the models (e.g., representative volume element) used for additively manufacturing heat transfer components or portions thereof. Examples of additive manufacturing techniques include, without limitation, 3D printing, stereolithography, fused-deposition modeling, electron-beam freeform fabrication, direct metal laser sintering, electron-beam melting, selective laser melting, selective heat sintering, selective laser sintering, plaster-based 3D printing, laminated-object manufacturing, digital-light processing, polyjet, powder bed inkjet printing, and the like.

The spinodal structures obtained by modeling phenomena, such as phase separation processes, may have any of several different forms. Thin shells may separate two or more volume fractions which may be separate and/or independent (e.g., hydraulically isolated), whereas a spinodal solid structure may be analogous to a thin shell structure in which one of the volume fractions is filled with a solid material. For example, in some embodiments, spinodal structures with bi-continuous topologies may include a spinodal shell structure in which a shell separates two mutually interpenetrating phases (or voids), each phase (or void) forming a spatially continuous interconnected domain hydraulically isolated from the other phase, or a spinodal solid structure in which one of the two mutually interpenetrating phases is a solid. The domains may define flow channel networks through which hot and cold fluids flow, thereby promoting heat transfer from one phase to another. The spinodal shell structures and/or spinodal solid structures may form continuous monolithic structures. The spinodal structures may have continuous and/or smooth surfaces. Being created through energy minimization, the spinodal structures may not have any sharp edges and/or corners. The surfaces of the spinodal structures may have nearly uniform negative Gaussian curvature, nearly zero mean curvature, or any combinations thereof.

As mentioned above, the spinodal structures may include thin shells or solids, anisotropic or directional. The spinodal structures may include one or more of an anisotropic spinodal shell structure, an anisotropic spinodal solid structure, a directional spinodal shell structure, and a direction spinodal solid structure. For example, in some embodiments, a spinodal structure includes a spinodal shell structure. In some embodiments, the spinodal shell structure includes an anisotropic spinodal shell structure. In some embodiments, the spinodal shell structure includes a directional spinodal shell structure. In some embodiments, a spinodal structure includes a spinodal solid structure. In some embodiments, the spinodal solid structure includes an anisotropic spinodal solid structure. In some embodiments, the spinodal solid structure includes a directional spinodal solid structure. As will be described in more detail below, the form of the spinodal structure used in the heat transfer components and/or heat transfer devices may depend on the function to be performed by the heat transfer device.

Referring now to FIGS. 3A-3D, schematic diagrams illustrating various aspects of a representative volume element 300 of a heat transfer component including an anisotropic spinodal shell structure is shown, according to one or more embodiments of the invention. In FIG. 3A, the anisotropic spinodal shell structure 305 is shown having a continuous monolithic structure, with opposing surfaces of the anisotropic spinodal shell structure defining two or more interpenetrating independent domains arranged in a bi-continuous topology. The interface between the two or more independent domains may be modeled as a thin shell and each of the two or more independent domains may be modeled as voids to generate the anisotropic spinodal shell structure 305. Through such modeling, the thickness of the interface may be varied spatially, e.g., non-uniformly, in one or more directions or regions to form a graded anisotropic spinodal shell structure (e.g., of non-uniform thickness). A first surface 310 of the anisotropic spinodal shell structure 305 may define a first flow channel network and a second surface 315 of the anisotropic spinodal shell structure 305 may define a second flow channel network, wherein the first flow channel network and the second flow channel network are arranged in a bi-continuous topology. The first flow channel network and the second flow channel network may be hydraulically isolated from each other. Within each flow channel network, a complicated irregular network of spatially continuous interconnected entangled flow channels may be provided, which may promote turbulent flow within and throughout each flow channel network.

Referring to FIGS. 3B-3D, the representative volume element 300 of a heat transfer component is shown, according to one or more embodiments of the invention. In FIG. 3B, the two or more independent domains defined by the anisotropic spinodal shell structure 305 may be represented by a hot domain 320 and a cold domain 330, wherein the first flow channel network defined by the first surface 310 includes the hot domain 320 and wherein the second flow channel network defined by the second surface 315 includes the cold domain 330. A fluid may flow (e.g., in hydraulic isolation) through each of the hot domain 320 and the cold domain 330 to effectuate heat transfer from one fluid to another. The bi-continuous topology of the interpenetrating domains may provide improved heat transfer across the anisotropic spinodal shell structure from a fluid flowing in the first flow channel network to a second fluid flowing in the second flow channel network. In FIGS. 3C-3D, the cold domain 320 and the hot domain 330 are shown separately, respectively, without the anisotropic spinodal shell structure 305, to show that the cold domain 320 and the hot domain 330 are hydraulically isolated from each other.

Referring to FIGS. 4A-4D, schematic diagrams illustrating various aspects of a representative volume element 400 of a heat transfer component including a directional spinodal shell structure is shown, according to one or more embodiments of the invention. In FIG. 4A, the directional spinodal shell structure 405 is shown having a continuous monolithic structure, with opposing surfaces of the directional spinodal shell structure 405 defining two or more interpenetrating independent domains arranged in a bi-continuous topology. The interface between the two or more independent domains may be modeled as a thin shell and each of the two or more independent domains may be modeled as voids to generate the directional spinodal shell structure 405. Direct penalization may be used to favor the growth of the two phases in a select or preferred direction. For example, a penalization may be constructed in the model to impart the directional characteristics to the structure 404. Through such modeling, the thickness of the interface may be varied spatially, e.g., non-uniformly, to form graded a graded directional spinodal shell structure. A first surface 410 of the directional spinodal shell structure 405 may define a first flow channel network and a second surface 415 of the directional spinodal shell structure 405 may define a second flow channel network, wherein the first flow channel network and the second flow channel network are arranged in a bi-continuous topology. The first flow channel network and the second flow channel network may be hydraulically isolated from each other. Within each flow channel network, a complicated irregular network of spatially continuous interconnected entangled flow channels may be provided, which may promote turbulent flow within and throughout each flow channel network.

Referring to FIGS. 4B-4D, the representative volume element 400 of a heat transfer component is shown, according to one or more embodiments of the invention. In FIG. 4B, the two or more independent domains defined by the directional spinodal shell structure 405 may be represented by a hot domain 420 and a cold domain 430, wherein the first flow channel network defined by the first surface 410 includes the hot domain 420 and wherein the second flow channel network defined by the second surface 415 includes the cold domain 430. A fluid may flow (e.g., in hydraulic isolation) through each of the hot domain 420 and the cold domain 430 to effectuate heat transfer from one fluid to another. The bi-continuous topology of the interpenetrating domains may provide improved heat transfer across the directional spinodal shell structure from a fluid flowing in the first flow channel network to a second fluid flowing in the second flow channel network. In FIGS. 4C-4D, the cold domain 420 and the hot domain 430 are shown separately, respectively, without the directional spinodal shell structure 405, to show that the cold domain 420 and the hot domain 430 are hydraulically isolated from each other.

Figure 5A:
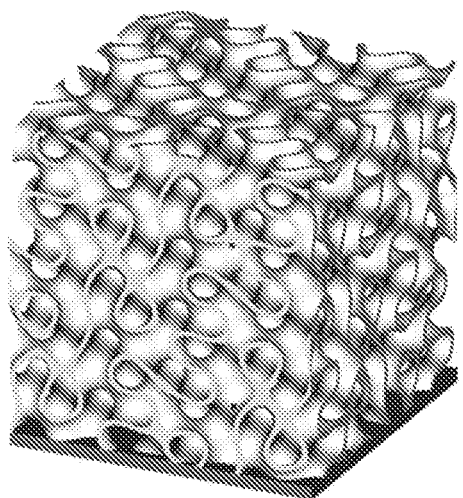
FIG. 5A is a schematic diagram of a representative volume element of a heat transfer component including an anisotropic spinodal shell structure, according to one or more embodiments of the invention.
Figure 5B:
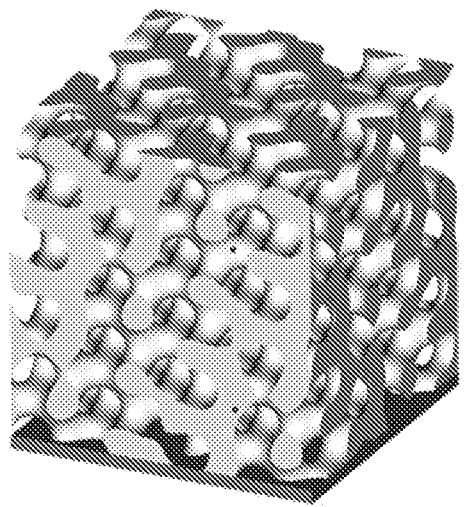
FIG. 5B is a schematic diagram of a representative volume element of a heat transfer component including an anisotropic spinodal solid structure, according to one or more embodiments of the invention.
Figure 5C:
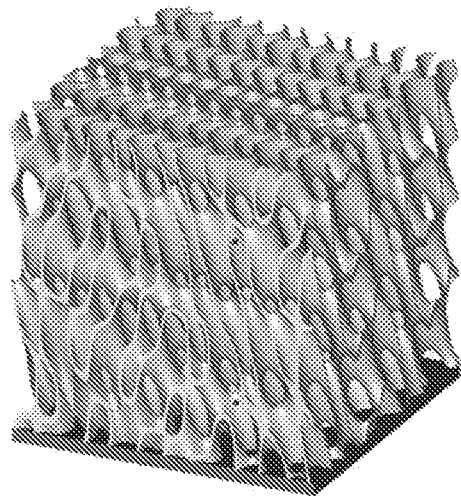
FIG. 5C is a schematic diagram of a representative volume element of a heat transfer component including a directional spinodal shell structure, according to one or more embodiments of the invention.
Figure 5D:
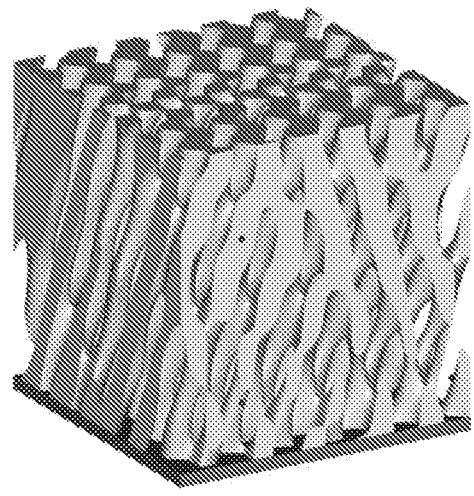
FIG. 5D is a schematic diagram of a representative volume element of a heat transfer component including a directional spinodal solid structure, according to one or more embodiments of the invention.

Referring to FIGS. 5A-5D, representative volume elements of heat transfer components including other configurations of spinodal structures with bi-continuous topologies are presented, according to one or more embodiments of the invention. In FIG. 5A, a schematic diagram of a representative volume element 500A including an anisotropic spinodal shell structure is shown, according to one or more embodiments of the invention. In FIG. 5B, a schematic diagram of a representative volume element 500B including an anisotropic spinodal solid structure is shown, according to one or more embodiments of the invention. In FIG. 5C, a schematic diagram of a representative volume element 500C including a directional spinodal shell structure is shown, according to one or more embodiments of the invention. In FIG. 5D, a schematic diagram of a representative volume element 500D including a directional spinodal solid structure is shown, according to one or more embodiments of the invention.

The spinodal solid structures of FIGS. 5B and 5D may be structurally analogous to spinodal shell structures of FIGS. 5A and 5C, respectively. For example, the anisotropic spinodal shell structure represented by volume element 500A may include two or more surfaces defining two or more flow channel networks. One of the flow channel networks of the anisotropic spinodal shell structure represented by volume element 500A may be modeled as a solid phase to generate the anisotropic spinodal solid structure represented by volume element 500B. Similarly, the directional spinodal shell structure represented by volume element 500C may include two or more surfaces defining two or more flow channel networks. One of the flow channel networks of the directional spinodal shell structure represented by volume element 500C may be modeled as a solid phase to generate the directional spinodal solid structure represented by volume element 500D.

Figure 6A:
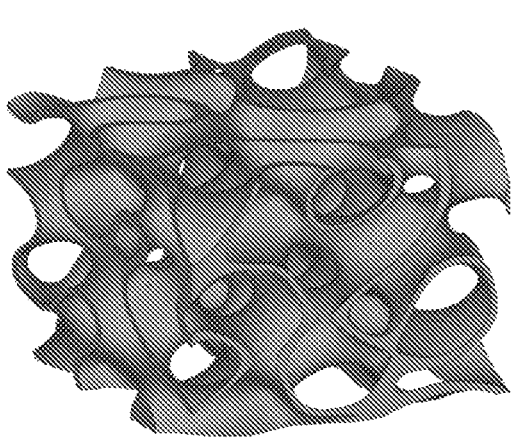
FIGS. 6A-6B are schematic diagrams of representative volume elements including (A) a heat transfer component including a spinodal shell structure and (B) a heat transfer component including a hierarchical spinodal shell structure in which modeling of a phase separation process is repeated within the spinodal shell structure shown in (A), according to one or more embodiments of the invention.
Figure 6B:
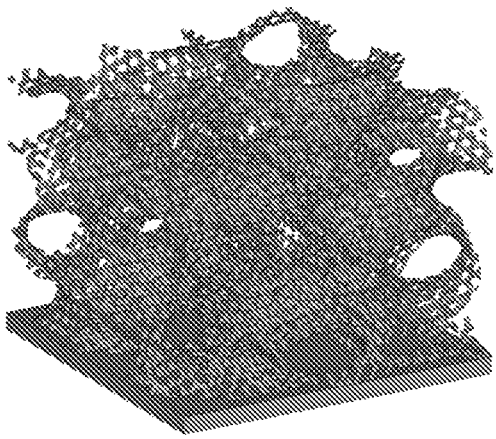

Referring to FIGS. 6A-6B, a schematic diagram of a spinodal shell structure and a hierarchical spinodal shell structure are shown, respectively, according to one or more embodiments of the invention. In FIG. 6A, a spinodal shell structure 600A obtained by modeling phenomena such as phase separation processes is shown. The same or different model may be repeated within the spinodal shell structure 600A to form a hierarchical spinodal shell structure, such as the hierarchical spinodal shell structure 600B shown in FIG. 6B. More specifically, in FIG. 6B, a second spinodal shell structure is shown included within the spinodal shell structure 600A to form a hierarchical spinodal shell structure 600B, wherein the spinodal shell structure has a bi-continuous topology obtained by modeling a second process (e.g., using a Cahn-Hilliard equation), which may be the same or different from the model used to generate the spinodal shell structure 600A. The hierarchical spinodal shell structure 600B may be obtained by modeling a spinodal decomposition process in the spinodal-shell domain.

Figure 7A:
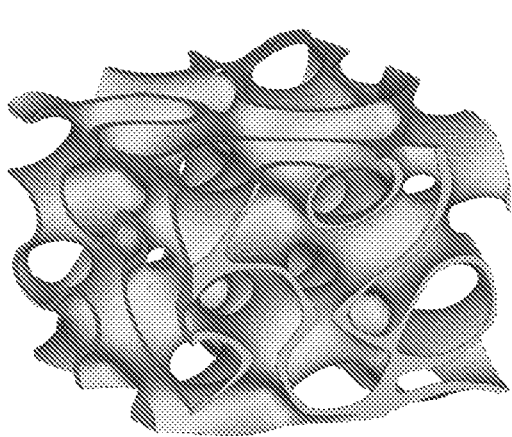
FIGS. 7A-7B are schematic diagrams of representative volume elements including (A) a heat transfer component including a spinodal shell structure and (B) a heat transfer component including the spinodal shell structure shown in (A) filled with a phase changing material, according to one or more embodiments of the invention.
Figure 7B:
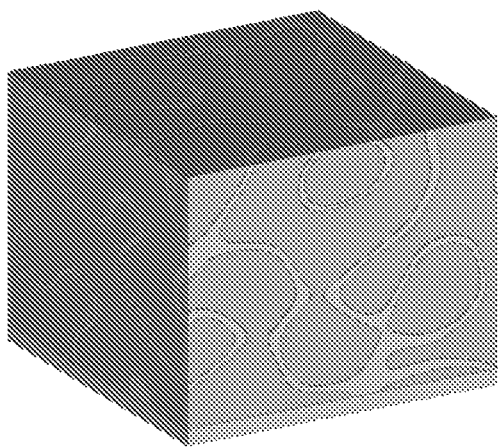

Referring to FIGS. 7A-7B, a schematic diagram of a spinodal shell structure and a spinodal shell structure including a phase-changing material are shown, respectively, according to one or more embodiments of the invention. In FIG. 7A, a spinodal shell structure 700A obtained by modeling phenomena such as phase separation processes is shown. The spinodal shell structure 700A may be filled with a phase changing material to form a heat storage device, such as the heat storage device 700B shown in FIG. 7B. More specifically, in FIG. 7B, a heat storage device 700B including a spinodal shell structure 702 and a phase changing material 704 is shown, wherein the phase changing material occupies a void domain in a spinodal shell structure obtained by modeling a spinodal decomposition process. The phase change material 704 may fill one or more of the flow channel networks defined by one or more of the surfaces of the spinodal shell structure 702.

Any of the spinodal structures from FIGS. 3-7 may be used for one or more of heat exchange, heat dissipation, heat storage, heat management, and other related heat transfer applications. As described above, construction of the heat transfer components and in particular of the spinodal structures (e.g., spinodal shell structures and/or spinodal solid structures) may be fabricated in parts or, preferably, as a whole. Fabrication as a whole may involve use of additive manufacturing to prepare a spinodal structure without any additional assembly, whereas fabrication in parts may involve contiguous periodic expansion of additively manufactured unit cells installed within a heat transfer device in one or more orthogonal directions (e.g., along a defined x-axis, along a defined y-axis, and/or along a defined z-axis). Accordingly, embodiments include, for example, heat transfer components including at least one of the spinodal structures of the present disclosure. Embodiments include heat transfer devices including a heat transfer component, wherein the heat transfer component includes at least one of the spinodal structures of the present disclosure. Examples of heat transfer components include, without limitation, heat exchanger cores, heat sink components, heat storage, components, heat management components, and the like. In some embodiments, a heat exchanger includes a heat exchanger core, wherein the heat exchanger core includes at least one of the spinodal structures of the present disclosure. In some embodiments, a heat sink includes a heat sink core, wherein the heat sink core includes at least one of the spinodal structures of the present disclosure. In some embodiments, a heat storage device includes a heat storage core, wherein the heat storage core includes at least one of the spinodal structures of the present disclosure and a heat storage material, such as a phase changing material.

A heat exchanger may include a heat exchange core including a spinodal shell structure obtained by modeling a spinodal decomposition process, the spinodal shell structure having a first surface defining a first flow channel network and a second surface defining a second flow channel network, wherein the first flow channel network and second flow channel network are interpenetrating domains arranged in a bi-continuous topology.

A heat sink may include a heat sink media including a spinodal solid structure and a flow channel network interpenetrating the spinodal solid structure, wherein the spinodal solid structure is obtained by modeling a spinodal decomposition process.

FIGS. 8A-8G are schematic diagrams of a counter-flow heat exchange device and related methods, according to one or more embodiments of the invention. FIG. 8A is a schematic diagram of at least a portion of a heat exchanger core 802 including a directional spinodal shell structure 803. FIG. 8B is a schematic diagram of a housing member 804 for the heat exchanger core 802. FIGS. 8C-8D are schematic diagrams of a heat exchange device 800 including a housing member 804 and a heat exchanger core 802, wherein the heat exchanger core 802 includes a directional spinodal shell structure 803. The directional spinodal shell structure 803 may include a first surface defining a first flow channel network and a second surface defining a second flow channel network, wherein the first flow channel network defines a cold domain 810 and the second flow channel network defines a hot domain 816 hydraulically isolated from the cold domain. The housing member 804 of the heat exchange device 800 may include a cold inlet 806 and a cold outlet 808 in fluid communication with the cold domain 810. The housing member 804 may further include a hot inlet 812 and a hot outlet 814 in fluid communication with the hot domain 816. The directional spinodal shell structure 803 of the heat exchanger core 802 may be installed in the housing member 804 of the heat exchange device 800 by contiguous periodic expansion of a representative volume element of the directional spinodal shell structure 803 in one or more orthogonal directions.

At one or more fluid inlets 806, 812 and/or one or more fluid outlets 808, 814, directional spinodal shell structure 803 may have an outer surface that includes openings to both the first flow channel network and the second flow channel network. In some embodiments, for example, in the case of a counter-flow heat exchanger, it may be desirable to flow a hot fluid through the hot domain 816 and a cold fluid through the cold domain 810 without mixing the hot fluid and the cold fluid at the fluid inlets 806, 812 and fluid outlets 808, 814. Accordingly, in some embodiments, the spinodal shell structure 803 may include one or more surfaces covering openings to one or more of the hot domain 816 and the cold domain 810 to prevent said fluids from mixing. For example, at a hot fluid inlet and a hot fluid outlet, the outer surface of the spinodal shell structure 803 may include one or more surfaces covering openings to the cold domain 810 to prevent a hot fluid from entering the cold domain 810. Similarly, at a cold fluid inlet and a cold fluid outlet, the outer surface of the spinodal shell structure 803 may include one or more surfaces covering openings to the hot domain 816 to prevent a cold fluid from entering the hot domain 816. In this way, the hot domain 816 hydraulically communicates with only a hot fluid inlet and a hot fluid outlet and the cold domain 810 hydraulically communicates with only a cold fluid inlet and a cold fluid outlet.

FIGS. 8D-8G are schematic diagrams illustrating the hot domains 816 and the cold domains 810. In FIG. 8D, the hot domain 816 and the cold domain 810 of the spinodal shell structure 803 are shown within the heat exchanger core 802 of the heat exchanger device 800. In FIG. 8E, a representative volume element of the hot domain 816 and the cold domain 810 of the spinodal shell structure 803 from the heat exchanger device 800 are shown. In FIG. 8F, the cold domain 810 is shown separated from the spinodal shell structure 803 and the hot domain 816. In FIG. 8E, the hot domain 816 is shown separated from the spinodal shell structure 803 and the cold domain 810. In this way, a hot fluid may enter the heat exchanger device 800 through the hot fluid inlet 812 and flow through the hot domain 816 of the spinodal shell structure 803 before exiting the heat exchange device 800 through the hot fluid outlet 814, while a cold fluid may enter the heat exchange device 800 through the cold fluid inlet 806 and flow through the cold domain 810, which is hydraulically isolated from the hot domain 816, before exiting the heat exchange device through the cold fluid outlet 808.

Figures 9A, 9B, 9C:
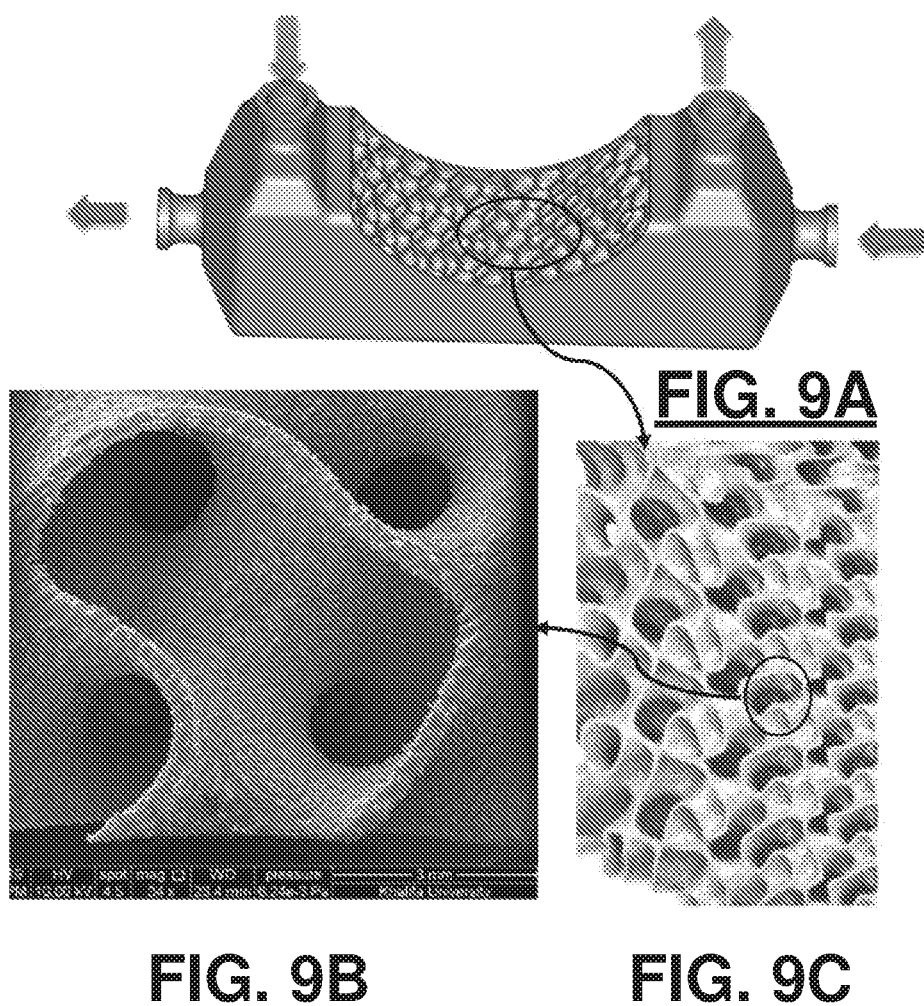
FIGS. 9A-9C include (A) a schematic diagram of a fabricated heat exchanger with a portion of the heat exchanger cutaway to show a spinodal shell structure therein and (B)-(C) are SEM images of a spinodal shell structure fabricated via additive manufacturing and demonstrating the manufacturability of the internal architecture, according to one or more embodiments of the invention.

Referring to FIG. 9A is a schematic diagram of a heat exchanger with a portion of the heat exchanger cutaway to show a spinodal shell structure therein, according to one or more embodiments of the invention. As shown in FIG. 9A, the heat exchanger 900 may include a spinodal shell structure 902 in a housing member 904. The spinodal shell structure 902 may include a first surface defining a first flow channel network and a second surface opposing the first surface defining a second flow channel network. The first flow channel network and the second flow channel network may be hydraulically isolated from each other and each may form a cold domain and a hot domain, respectively. A cold inlet 904 and a cold outlet 906 may be in fluid communication with the cold domain formed by the first flow channel network. A hot inlet 908 and a hot outlet 910 may be in fluid communication with the hot domain formed by the second flow channel network. The spinodal shell structure may be constructed within the housing member or at least a portion thereof or separately fabricated and installed within the housing member by additive manufacturing methods. As shown, the spinodal shell structure may be fabricated in various shapes and sizes to form to the shape and size of the housing member 904. FIGS. 9B-9C are SEM images of a spinodal shell structure fabricated via additive manufacturing and demonstrating the manufacturability of the internal architecture.

As mentioned above, spinodal decomposition can be modeled by solving the Cahn-Hilliard phase field model numerically. In this model, a phase field variable is locally driven to one of the two stable phases in which one phase is donated by a unity value and the second phase is donated by a zero value. The two phases that result from solving the Cahn-Hiliard model are separated by single continuous and smooth interface. Energetically favorable directions for microstructural growth can be realized by the construction of appropriate penalizations in the Cahn-Hilliard phase field model. As such, the two resulting phases can be controlled to favor a certain direction. A second phase-field approach that can generate a bi-continuous topology separated by a surface with nearly uniform negative Gaussian curvature and nearly zero mean curvature is through solving the Allen-Allen-Cahn or Ginzburg-Landau equation that describes the process of phase separation in multi-component alloy systems. A third approach that can be used to generate a bi-continuous topology separated by a surface with nearly uniform negative Gaussian curvature and nearly zero mean curvature is through using the Gaussian Random Field (GRF) method, which is based on superimposing standing sinusoidal functions with fixed wavelengths but random amplitudes, directions and/or phase angles.

A spinodal-shell structure can be obtained by modeling the interface of a spinodal decomposition as a solid shell and the two phases as voids. This spinodal-shell structure is a solid shell porous microstructure that splits the space into two maze-like volumes. A spinodal-solid structure can be obtained by modeling one of the phases in a spinodal decomposition as a solid structure and the second phase as voids. This spinodal-solid structure is single and continuous structure. The domain used to model the spinodal decomposition process can be uniform or arbitrary.

In some embodiments, the Cahn-Hilliard equation, which may be used to model a diffusion-type phase separation phenomena in binary alloys, may describe spinodal decomposition to form spinodal structures and then shell-based stochastic bicontinuous cellular solids, such that it is written as $$\frac{\partial u}{\partial t} = D\nabla^2 v, v = \frac{df(u)}{du} - \gamma\nabla^2 u \Rightarrow \frac{\partial u}{\partial t} = D\nabla^2\left[\frac{df(u)}{du} - \gamma\nabla^2 u\right], \quad (1)$$

where u(x, y, z, t) is the concentration of phase in the mixture at coordinates x, y, z with evolution time t, $\nabla^2$ is the Laplacian operator, D is the diffusion coefficient which determines the mobility of the phase, γ determines the thickness of interface between the two phases, and f(u) is the chemical potential function, which may take various forms depending on the intended phenomenon to describe, where either of the following forms may be assumed:

$$f(u)=(u^2-1)^2 \text{ or } f(u)=(u(u-1))^2, \quad (2)$$

where u is to be bounded between −1 and 1 or 0 and 1 representing either phases. Any one or more of the aforementioned parameters may be varied to adjust one or more properties or characteristics of the spinodal shell structure and/or spinodal solid structure.

In some embodiments, at least one of the Allen-Cahn equation and the Ginzburg-Landau equation may be used. Said equations describe the process of phase separation in multi-component alloy systems, including order-disorder transitions, superconductivity, martensitic transformation, and/or dislocation dynamics and it may be expressed by $$\frac{\partial u}{\partial t} = -D\left(\frac{df(u)}{du} - \gamma\nabla^2 u\right) \quad (3)$$

where f(u) may be given by either of the expressions in Eq. (2).

The Cahn-Hilliard, Allen-Cahn, and/or Ginzburg-Landau equations may be implemented, for example, in various softwares, including multiphysics software COMSOL which may be used to solve a second-order partial differential equation (PDE). COMSOL may then be used to generate 3D stochastic bicontinuous cellular solids or solid-network foams where one of the two phases is a void space whereas the other phase is a solid as demonstrated next (e.g., spinodal-shell structures, spinodal-solid structures, etc.).

FIGS. 10-11 depict a procedure of generating the solid-network and sheet-network stochastic cellular solids or foams using both Cahn-Hilliard and Allen-Cahn phase-field equations subjected to an initial condition at t=0. In FIGS. 10 and 11, the evolution of the phase-field parameter u, respectively, for both Cahn-Hilliard and Allen-Cahn phase-field equations at three different evolution times ($t_1$, $t_2$, $t_3$) are shown such that as time increases the sizes of the phases are getting coarser. The generated phase-field 3D plot (in FIGS. 10A1, 10B1, 10C1, 11A1, 11B1, 11C1) is then sliced into 2D images and subsequently image-processed each slice using thresholding with, for example u=0.5, in order to identify both phases. Then, the processed 2D images are stacked together generating the 3D solid-network foam (in FIGS. 10A2, 10B2, 10C2, 11A2, 11B2, 11C2). Shell/sheet-network foam is generated by extracting the surface (in FIGS. 10A3, 10B3, 10C3, 11A3, 11B3, 11C3) using, for example, "isosurface" command in COMSOL and then thickening the surface in, for example, GeoMagic visualization software using the "Shell" function. The solid volume fraction (or equivalently the relative density of the foam) is controlled through changing the thickness of the shell. Following this procedure, different stochastic sheet-network foams are generated as shown in the last column of FIGS. 10 and 11. Using this approach, one can generate sheet-network foam of different solid volume fractions that separate two phases using both phase-field methods for Cahn-Hilliard and Allen-Cahn equations.

In some embodiments, a method of using shell structures modeled by computationally solving a spinodal decomposition process to make heat exchangers and heat sinks components is provided. Specifically, a method of using shell structures modeled by computationally solving a spinodal decomposition process may be provided to make heat exchangers and heat sinks components by additive manufacturing.

In some embodiments, a method of creating a heat exchanger is provided, wherein the shell that separates the two fluids is a spinodal-shell structure of the present disclosure. The spinodal-shell structure may be characterized as having no sharp corners due to being created by energy minimization. The structure may be continuous and smooth.

Using energetically favorable directions for microstructural growth in the computational solution of one or more of the Cahn-Hilliard phase field model, Allen-Cahn phase field model, and the Gaussian Random Field (GRF) method allows for controlling the topology of the two phases to minimize the pressure drop.

In some embodiments, a method of creating heat sinks is provided, wherein the heat dissipation media is a spinodal shell structure of the present disclosure.

In some embodiments, a method of creating heat sinks is provided, wherein the heat dissipation media is a spinodal solid structure of the present disclosure.

In some embodiments, a heat exchanger and/or heat sink having an improved convection coefficient may increase heat transfer efficiency. In some embodiments, an increase in turbulence (e.g., turbulent flow through one or more of the flow channel networks of a spinodal shell structure and/or a spinodal solid structure) resulting from the entangled (e.g., tortuous, circuitous, irregular, complicated, and/or labyrinth) nature of the flow channels may increase a convective coefficient causing a corresponding increase in heat transfer efficiency.

In some embodiments, a heat exchanger and/or heat sink having an improved hydrodynamics may increase heat transfer efficiency and/or reduce fouling. In some embodiments, the entangled nature of the flow channels increases the turbulence within the flow channels and reduces fouling.

In some embodiments, the use of spinodal-shell structures increases the surface area to volume ratio and this reduces the overall weight by making the heat exchanger more compact.

In some embodiments, a design based on spinodal-shell structures may be used. The spinodal shell structures—and their complicated, curved, continuous and smooth shapes—may be fabricated using automated additive manufacturing techniques (3-D printing) that enable manufacturing complex geometries in a relatively fast and efficient way. This technique may employ the use of a computer to design the desired shapes and later manufacture the design using computer-controlled manufacturing.

In some embodiments, the use of additive manufacturing techniques permits fabrication of a heat exchanger in one step, eliminating the costs associated with machining and assembling several components.

In some embodiments, the single step fabrication avoids the use of multicomponent heat transfer devices and improves the leak tightness of the heat exchanger, leading to extended service life.

In some embodiments, the spinodal decomposition process is repeated within the volume (e.g., a spinodal structure domain, a void domain, a solid domain, or any combination thereof) that is obtained from modeling a spinodal decomposition process to yield a hierarchal structure. The domain of the second spinodal decomposition may be the spinodal-shell or the spinodal-solid, or a combination thereof.

In some embodiments, the thickness of the spinodal shell and/or the size of the void space enclosed by the spinodal shell is varied spatially to create a functionally graded spinodal-shell.

In some embodiments, the solid volume fraction of the spinodal solid and/or the size of the void space enclosed by the spinodal solid is varied spatially to create a functionally graded spinodal-solid.

In some embodiments, the void domains separated by a spinodal-shell can be filled with phase changing materials to create a spinodal-based heat storage device.

In some embodiments, a method of making heat exchange device/component may include generating a computer aided design (CAD) file representing a heat exchange component (e.g., a heat exchanger core), storing the computer aided design file to memory, and fabricating a heat exchange component additively using additive manufacturing, such as 3D printing. In some embodiments, the heat exchange component includes a heat exchanger core and the heat exchanger core includes two volumes separated by a thin shell, wherein the two volumes and the thin shell are obtained by modeling a spinodal decomposition process and modeling the interface as a thin shell and the two phases as voids.

In some embodiments, a method of making heat storage device comprising generating a computer aided design (CAD) file representing a heat storage component, storing the computer aided design file to memory, and fabricating a heat storage component additively using additive manufacturing, such as 3D printing. In some embodiments, the heat storage component includes a heat dissipation media including two volumes separated by a thin shell, wherein the two volumes and the thin shell are obtained by modeling a spinodal decomposition process and modeling the interface as a thin shell and the two volumes as voids. In some embodiments, one or more of the two volumes are later filled with a phase change material for heat storage.

In some embodiments, a method of making heat sink components comprising generating a computer aided design (CAD) file representing a heat sink component, storing the computer aided design file to memory, and fabricating the heat sink component additively using additive manufacturing, such as 3D printing. In some embodiments, the heat sink component in the heat sink includes a thin shell, wherein=the thin shell is obtained by modeling a spinodal decomposition process and modeling the interface as a thin shell.

In some embodiments, a method of making heat sink components comprising generating a computer aided design (CAD) file representing a heat sink component, storing the computer aided design file to memory, and fabricating the heat sink component additively using additive manufacturing, such as 3D printing. In some embodiments, the heat sink component in the heat sink is a solid phase, wherein the solid phase is obtained by modeling a spinodal decomposition process and modeling at least one of the phases in the spinodal decomposition as a solid and at least one other phase as a void.

In some embodiments, a method of making a heat sink components comprising generating a computer aided design (CAD) file representing a heat sink component, storing the computer aided design file to memory, and fabricating the heat sink component additively using additive manufacturing, such as 3D printing. In some embodiments, the heat transfer media in the heat sink is a hierarchal structure obtained by modeling the spinodal decomposition process again within the spinodal-shell or spinodal-solid.

In some embodiments, a method of making heat sink components comprising generating a computer aided design (CAD) file representing a heat sink component, storing the computer aided design file to memory, and fabricating the heat sink component additively using additive manufacturing, such as 3D printing. In some embodiments, the heat transfer media in the heat sink is a thin shell, wherein the thin shell is obtained by modeling a spinodal decomposition process and modeling the interface as a thin shell. in which the thickness of the thin shell can be varied spatially.

In some embodiments, the heat transfer components are used in one or more of the following: heating and air-conditioning systems in a household, oil and gas, power production in large plants, and car radiators.

What is claimed is:

1. A heat transfer component comprising:
a spinodal structure having a bi-continuous topology obtained by modeling a spinodal decomposition process, wherein the spinodal structure having the bi-continuous topology is a spinodal shell structure or a spinodal solid structure.

2. The heat transfer component according to claim 1, wherein the spinodal decomposition process is modeled using a Cahn-Hilliard equation.

3. The heat transfer component of claim 1, wherein the spinodal decomposition process is modeled using an Allen-Cahn equation.

4. The heat transfer component of claim 1, wherein the spinodal decomposition process is modeled using a Ginzburg-Landau equation.

5. The heat transfer component of claim 1, wherein the spinodal decomposition process is modeled using a Gaussian Random Field model.

6. The heat transfer component of claim 1, wherein the spinodal structure having the bi-continuous topology is a directional spinodal structure or an anisotropic spinodal structure.

7. The heat transfer component of claim 1, wherein the spinodal structure forms an interface having one or more of a nearly uniform negative Gaussian curvature and a nearly zero mean curvature.

8. The heat transfer component of claim 1, wherein the spinodal shell structure is obtained by modeling an interface of a spinodal decomposition process as a thin shell and each of at least two phases as voids.

9. The heat transfer component of claim 1, wherein the spinodal shell structure includes a first surface defining a first flow channel network and a second surface opposing the first surface and defining a second flow channel network.

10. The heat transfer component of claim 1, wherein the first flow channel network and the second flow channel network are hydraulically isolated from each other.

11. The heat transfer component of claim 1, where each of the first flow channel network and the second flow channel network is a spatially continuous, interconnected network of flow channels.

12. The heat transfer component of claim 1, wherein the thickness of the spinodal shell structure is non-uniform and forms a graded spinodal shell structure.

13. The heat transfer component of claim 1, wherein the spinodal shell structure includes a second spinodal structure having a bi-continuous topology obtained by modeling a spinodal decomposition process and forms a hierarchical spinodal shell structure.

14. The heat transfer component of claim 1, wherein the spinodal shell structure is obtained by modeling at least one phase of a spinodal decomposition process as a solid and at least one phase of a spinodal decomposition process as a void.

15. The heat transfer component of claim 1, wherein the spinodal shell structure is structurally analogous or equivalent to a spinodal shell structure in which at least one of the first flow channel network and the second flow channel network is filled with a solid material.

16. The heat transfer component of claim 1, wherein the spinodal solid structure includes a second spinodal structure having a bi-continuous topology obtained by modeling a spinodal decomposition process and forms a hierarchical spinodal solid structure.

17. A heat exchanger comprising the heat transfer component of claim 1, wherein the spinodal structure is a spinodal shell structure.

18. A heat sink comprising the heat transfer component of claim 1, wherein the spinodal structure is a spinodal solid structure.

19. A heat storage device comprising the heat transfer component of claim 1, wherein the spinodal structure is a spinodal solid structure including a phase change material for heat storage.

20. A method of making an article of manufacture comprising additively manufacturing a heat transfer component of claim 1.

* * * * *